(12) United States Patent
Jouppi et al.

(10) Patent No.: US 7,324,664 B1
(45) Date of Patent: Jan. 29, 2008

(54) METHOD OF AND SYSTEM FOR DETERMINING ANGULAR ORIENTATION OF AN OBJECT

(75) Inventors: Norman Paul Jouppi, Palo Alto, CA (US); April Marie Slayden, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 579 days.

(21) Appl. No.: 10/696,238

(22) Filed: Oct. 28, 2003

(51) Int. Cl.
*G06K 9/00* (2006.01)
*G06K 9/34* (2006.01)
*G06K 9/36* (2006.01)
*G06K 9/32* (2006.01)
*H04N 5/225* (2006.01)

(52) U.S. Cl. .............. 382/103; 382/276; 382/286; 382/173; 382/293; 382/298; 382/300; 348/169

(58) Field of Classification Search .............. 382/103, 382/154, 286, 291, 293, 297, 300, 118, 162–167, 382/298, 299, 173–176; 348/77; 358/518–540
See application file for complete search history.

(56) References Cited

U.S. PATENT DOCUMENTS

| | | | |
|---|---|---|---|
| 5,373,857 A | 12/1994 | Travers et al. | |
| 5,588,435 A * | 12/1996 | Weng et al. | 600/443 |
| 5,819,206 A * | 10/1998 | Horton et al. | 702/150 |
| 5,828,770 A * | 10/1998 | Leis et al. | 382/103 |
| 5,872,922 A * | 2/1999 | Hogan et al. | 709/204 |
| 5,990,934 A * | 11/1999 | Nalwa | 348/36 |
| 6,009,210 A | 12/1999 | Kang | |
| 6,208,373 B1 * | 3/2001 | Fong et al. | 348/14.16 |
| 6,292,713 B1 | 9/2001 | Jouppi et al. | |
| 6,369,814 B1 * | 4/2002 | Dorbie | 345/419 |
| 6,370,260 B1 * | 4/2002 | Pavlidis et al. | 382/103 |
| 6,381,350 B1 * | 4/2002 | Klingensmith et al. | 382/128 |
| 6,437,759 B1 | 8/2002 | Turner et al. | |
| 6,546,116 B2 | 4/2003 | Brunk et al. | |
| 6,710,867 B2 * | 3/2004 | Bellm et al. | 356/237.1 |
| 6,724,417 B1 * | 4/2004 | Hillis et al. | 348/14.16 |
| 6,771,835 B2 * | 8/2004 | Han et al. | 382/260 |
| 6,792,134 B2 * | 9/2004 | Chen et al. | 382/117 |
| 6,914,622 B1 * | 7/2005 | Smith et al. | 348/14.05 |
| 6,922,494 B1 * | 7/2005 | Fay | 382/298 |
| 6,937,745 B2 * | 8/2005 | Toyama | 382/103 |
| 6,961,461 B2 * | 11/2005 | MacKinnon et al. | 382/164 |

(Continued)

FOREIGN PATENT DOCUMENTS

EP  689356 A2 * 12/1995
EP  1398734 A2 * 3/2004

OTHER PUBLICATIONS

Norman Paul Jouppi, U.S. Appl. No. 10/376,435, filed Apr. 25, 2003.

Primary Examiner—Jingge Wu
Assistant Examiner—José M Torres

(57) ABSTRACT

A method of and system for determining the angular orientation of an object, such as a person's head. In one aspect, a plurality of images of the object is obtained. Values are assigned to a plurality of positions in a polar plot using data from the images. A centroid is computed based on the assigned values. An angle of the centroid with respect to an origin of the polar plot indicates the angular orientation of the object.

38 Claims, 6 Drawing Sheets

U.S. PATENT DOCUMENTS

| | | |
|---|---|---|
| 7,068,856 B2 * | 6/2006 | Albertelli et al. ........... 382/289 |
| 7,082,221 B1 * | 7/2006 | Jiang ........................... 382/239 |
| 2002/0118861 A1 | 8/2002 | Jouppi et al. |
| 2002/0141595 A1 | 10/2002 | Jouppi |
| 2003/0179950 A1 * | 9/2003 | Komura et al. ............. 382/275 |
| 2004/0032970 A1 * | 2/2004 | Kiraly ......................... 382/103 |
| 2004/0051716 A1 * | 3/2004 | Sevigny ...................... 345/589 |
| 2004/0213460 A1 * | 10/2004 | Chen ........................... 382/199 |
| 2004/0247173 A1 * | 12/2004 | Nielsen et al. .............. 382/154 |
| 2005/0072903 A1 * | 4/2005 | Voss et al. ................. 250/208.1 |
| 2005/0248972 A1 * | 11/2005 | Kondo et al. ................ 365/125 |

* cited by examiner

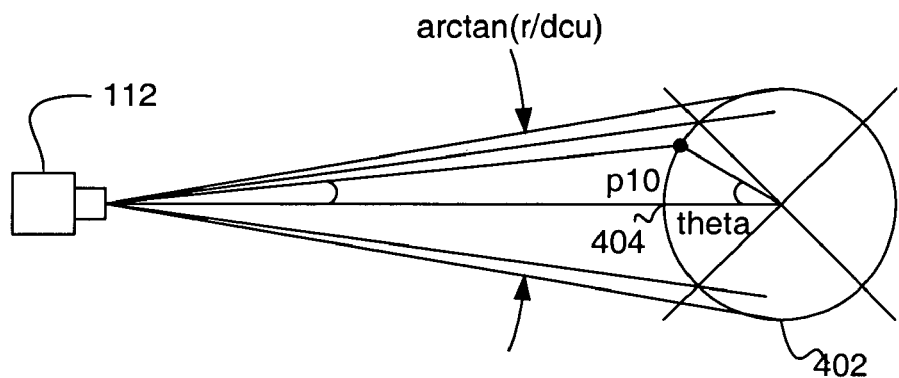
FIG. 5
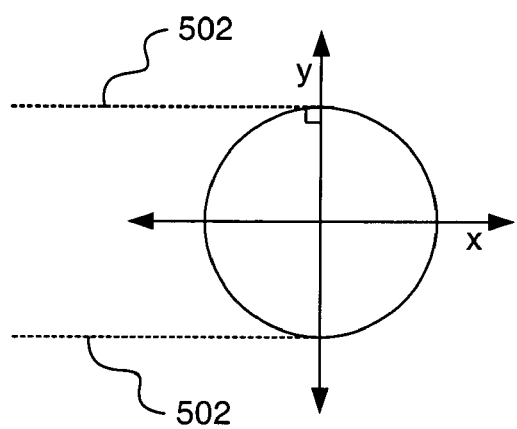 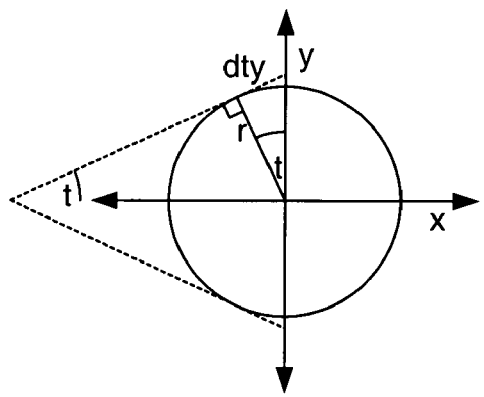
FIG. 6A  FIG. 6B

METHOD OF AND SYSTEM FOR DETERMINING ANGULAR ORIENTATION OF AN OBJECT

RELATED APPLICATIONS

The present application contains subject matter related to co-pending U.S. patent application Ser. No. 09/784,902, filed Feb. 15, 2001, and U.S. patent application Ser. No. 10/376,435, filed Feb. 27, 2003, the entire contents of both of which are hereby incorporated by reference.

FIELD OF THE INVENTION

The present invention relates to tracking the movement and positioning of an object, such as a person's head, and more particularly, the present invention relates to determining the angular orientation of such an object.

BACKGROUND OF THE INVENTION

Telepresence systems allow a user at one location to view a remote location (e.g., a conference room) as if they were present at the remote location. Mutually-immersive telepresence system environments allow the user to interact with individuals present at the remote location. In a mutually-immersive environment, the user is provided a display apparatus including a projection surface that typically surrounds the user. Cameras are positioned about the display area to collect images of the user. Live color images of the user are acquired by the cameras and subsequently transmitted to the remote location, concurrent with projection of live video from the remote location on the projection surfaces surrounding the user. The user is able to move about within the display area; thus algorithms are needed to track the movements of the user, particularly movements of the user's head.

Conventional head tracking methods include generating a representation of a user's head based on the detection of the user's eyes or other facial features. An example of such a method would be to use the retro-reflectivity property of the human eye, when illuminated by light, to detect and track head position. A drawback associated with such an approach is that the head of the person being tracked must always be facing a camera. If the user turns away from the camera, eye reflectivity can no longer be detected. Thus, head position tracking cannot be accurately maintained.

Another conventional head tracking method calls for the local user to wear tracking hardware, such as is used for motion capture in computer graphics, and to transform the position information obtained from the tracking hardware into a bounding box image based on the lens focal length of the tracking hardware and the particular system geometry. A drawback associated with this approach is that the local user would have to be burdened with wearing the oftentimes cumbersome tracking hardware. Also, the tracking hardware degrades final image quality, as the tracking hardware would be visible in any resulting image.

What is needed is an improved technique for tracking the movement and positioning of an object, for example, a person's head. What is further needed is a technique for determining the angular orientation of such an object. It is toward these ends that the present invention is directed.

SUMMARY OF THE INVENTION

The present invention provides a technique for determining the angular orientation of an object, such as a person's head. In one aspect, a plurality of images of the object is obtained. Luminance values are assigned to a plurality of positions in a polar plot using data from the images. A centroid is computed based on the assigned luminance values. An angle of the centroid with respect to an origin of the polar plot indicates the angular orientation of the object.

These and other aspects of the invention are described in more detail herein.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, and in which:

FIG. 5 is a schematic view of a camera viewing a user's head in the display apparatus of FIG. 1, seen from above in accordance with an embodiment of the present invention;

FIG. 6A shows rays from a camera intersecting an approximation of the user's head at a y-axis in accordance with an embodiment of the present invention;

FIG. 6B shows the rays from the camera being tangent to the cylinder before the y-axis is reached in accordance with an embodiment of the present invention.

DETAILED DESCRIPTION OF THE INVENTION

Figure 1:
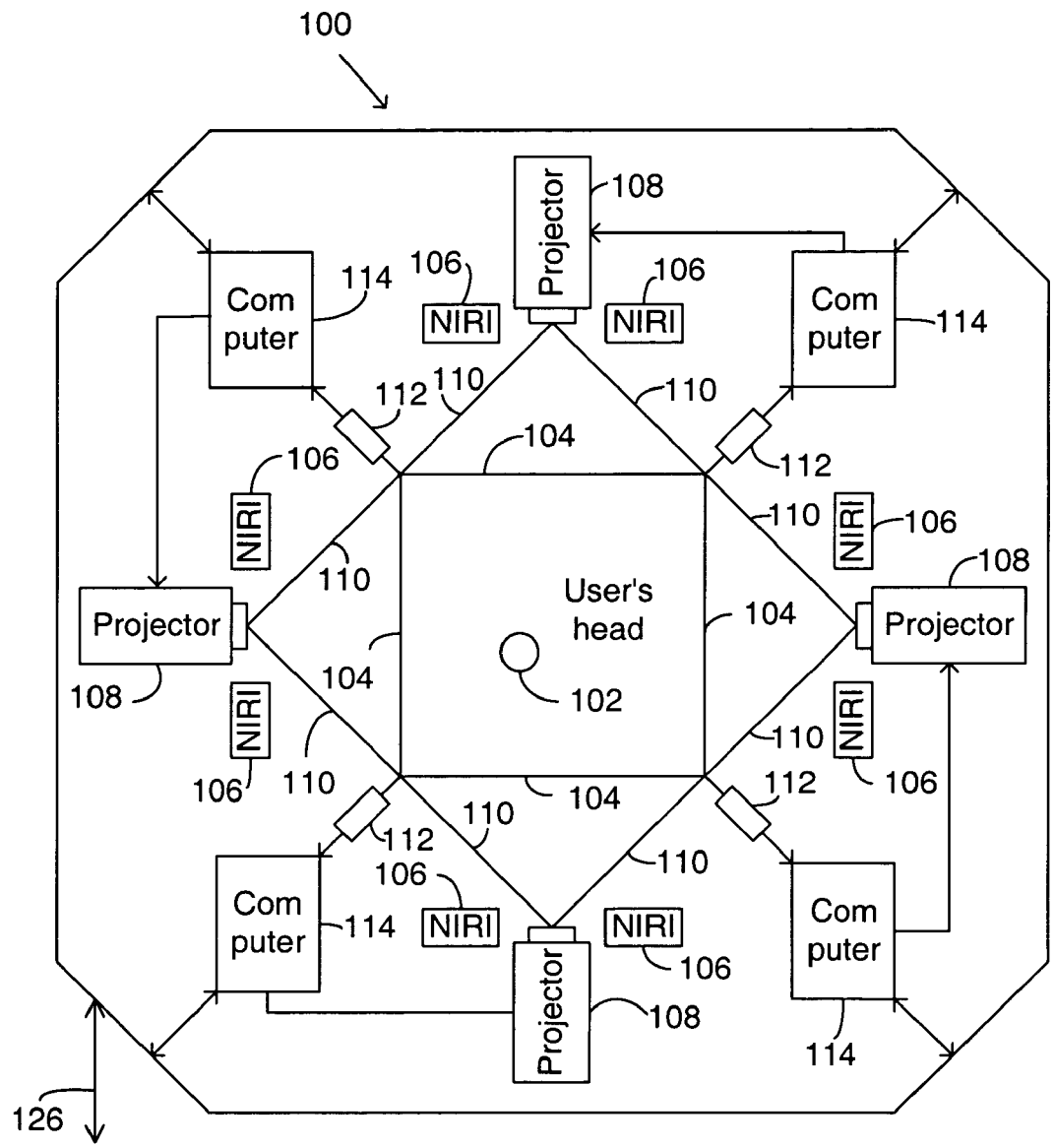
FIG. 1 is a schematic top view of a display apparatus used in the mutually-immersive telepresence system in accordance with an embodiment of the present invention.

The present invention provides a method of and system for determining the angular orientation of an object, such as a person's head. The invention is particularly useful for telepresence systems, including mutually immersive telepresence systems. For example, knowledge of the angular position of a person's head allows the person's voice to be directed appropriately (e.g., by selecting or aiming a speaker) when re-created at a location that is remote from the user. Thus, the invention is described in the context of a mutually-immersive telepresence system. It will be apparent, however, that the present invention is not limited to telepresence systems. Rather, advantages of the present invention may be obtained whenever it is advantageous to have knowledge of the angular position of an object, such as a person's head.

In an exemplary mutually-immersive telepresence system, a "local" user is positioned within a display apparatus. A light-transmissive projection screen is positioned at each of four sides of the display apparatus. Thus, a projection screen is always positioned substantially behind the local user. Near-infrared illuminators are positioned behind the projection screens. The near-infrared illuminators provide near-infrared light uniformly against the projection screens. A projector, which is adapted not to emit light in the near-infrared spectrum, is positioned about the near-infrared illuminators behind the projection screen. The projector provides a video image of the remote location on the projection screen. A camera unit, including a stacked color camera and a near-infrared camera, is positioned at the corners of the display apparatus. The near-infrared camera obtains a still image of the display apparatus with the user absent (i.e. a baseline image). Then, when the user is present in the display apparatus, the baseline image is subtracted from images newly obtained by the near-infrared camera. The resulting difference images show only the user. This is referred to as difference keying. The difference images are also filtered for noise and other artifacts (e.g., by ignoring difference values that fall below a predetermined threshold).

Images from four sides of the person's head are obtained from the near-infrared cameras. Luminance values at the expected eye level of each view of the user's head obtained from the images are assigned to each of a plurality of positions in a polar plot. The polar plot approximates the person's head as a cylinder, e.g., of approximately ten inches in diameter. Assigning luminance values may be accomplished by dividing the polar plot into quadrants, one for each of the four images, locating each position in the polar plot with respect to an origin and determining a corresponding luminance value from the images. A centroid is then computed based on the assigned luminance values. The angle of the centroid with respect to the origin of the polar plot indicates the angular orientation of the object.

Thus, the invention makes use of the fact that people's heads are generally symmetrical and that the luminance of the front of a person's head is distinguishable from the luminance of the back of the person's head, particularly at approximately the eye level and below. It will be apparent that the invention may be used to determine the angular orientation of an object other than a person's head having luminance differences around the circumference of the object (i.e. the luminance is non-uniform).

FIG. 1 is a schematic top view of an exemplary display apparatus 100 which may be used to provide a mutually-immersive environment and which is adapted to determine the angular orientation of the head 102 of the local user according to the present invention. The display apparatus 100 comprises a display room having a rear projection screen 104 provided on each side of the display room, thereby surrounding the local user. A plurality of near-infrared illuminators 106 is positioned behind rear projection screen 104 along each side of the display apparatus 100. The near-infrared illuminators 106 are operative to uniformly illuminate the rear projection screen 104 with light having a wavelength in the near-infrared (700-1000 nm) spectrum. In an exemplary embodiment of the present invention, the near-infrared illuminators 106 are implemented using incandescent light bulbs, covered with visible-cut near-infrared pass filters. Other illumination mechanisms, such as a bank of light emitting diodes (LEDs) having a peak output wavelength of about 880 nm and a bandwidth of about 80 nm can also be used.

A rear projector 108 is also positioned behind the rear projection screen 104 along each side of the display apparatus 100. Each rear projector 108 is generally positioned between the near-infrared illuminators 106 and is used to project a video image of the remote location on the rear projection screen 104. The output beam lines from each rear projector 108 are shown as lines 110. As the user is positioned in the central portion of the display apparatus 100, the video image provided by the rear projector 108 (encompassed within the beam lines 110) surrounds the local user. In this fashion, the local user is provided with a sensation of actually being at, or within, the remote location. Each rear projector 108 includes a series of color (red, green, blue) filters (not shown) that filter out substantially all of the near-infrared light energy generated by the lamp within the projector. As such, only negligible amounts of near-infrared light are provided by each rear projector 108. Thus, the only significant sources of near-infrared light within the display apparatus 100 are the near-infrared illuminators 106. This becomes important when detecting head position as discussed in greater detail below.

Figure 2:
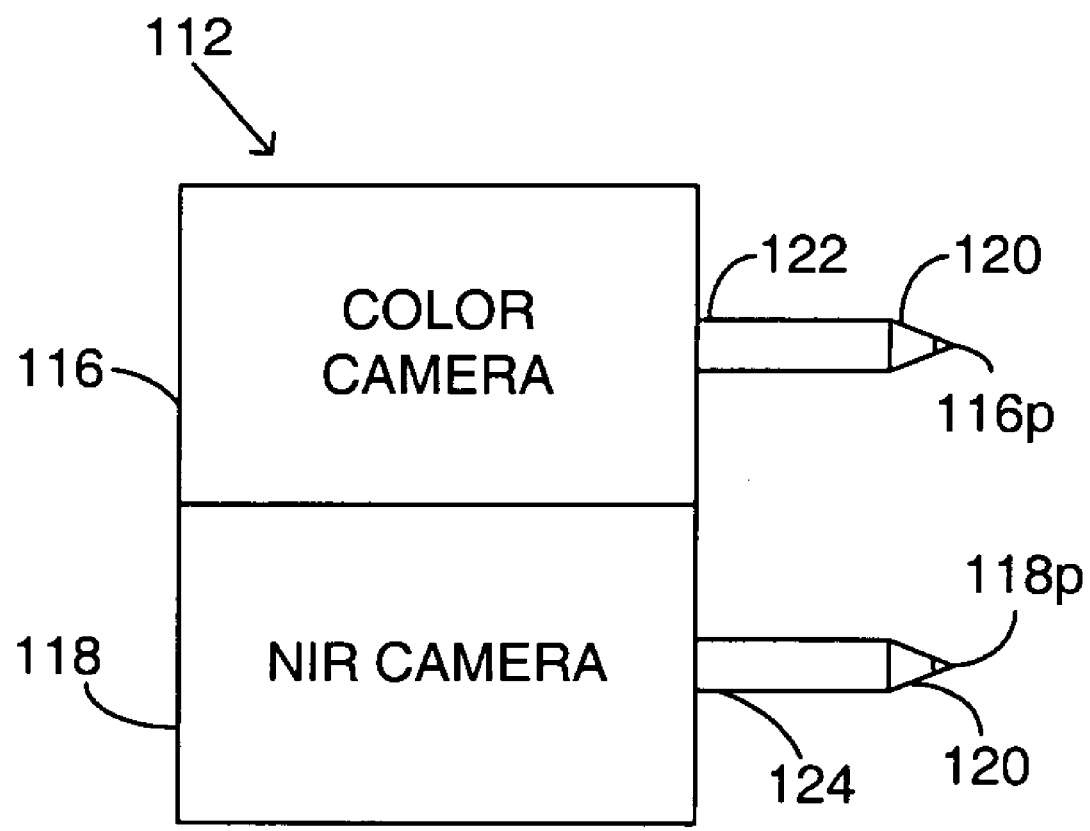
FIG. 2 is a schematic view of the camera unit used in the display apparatus illustrated in FIG. 1.
Figure 3:
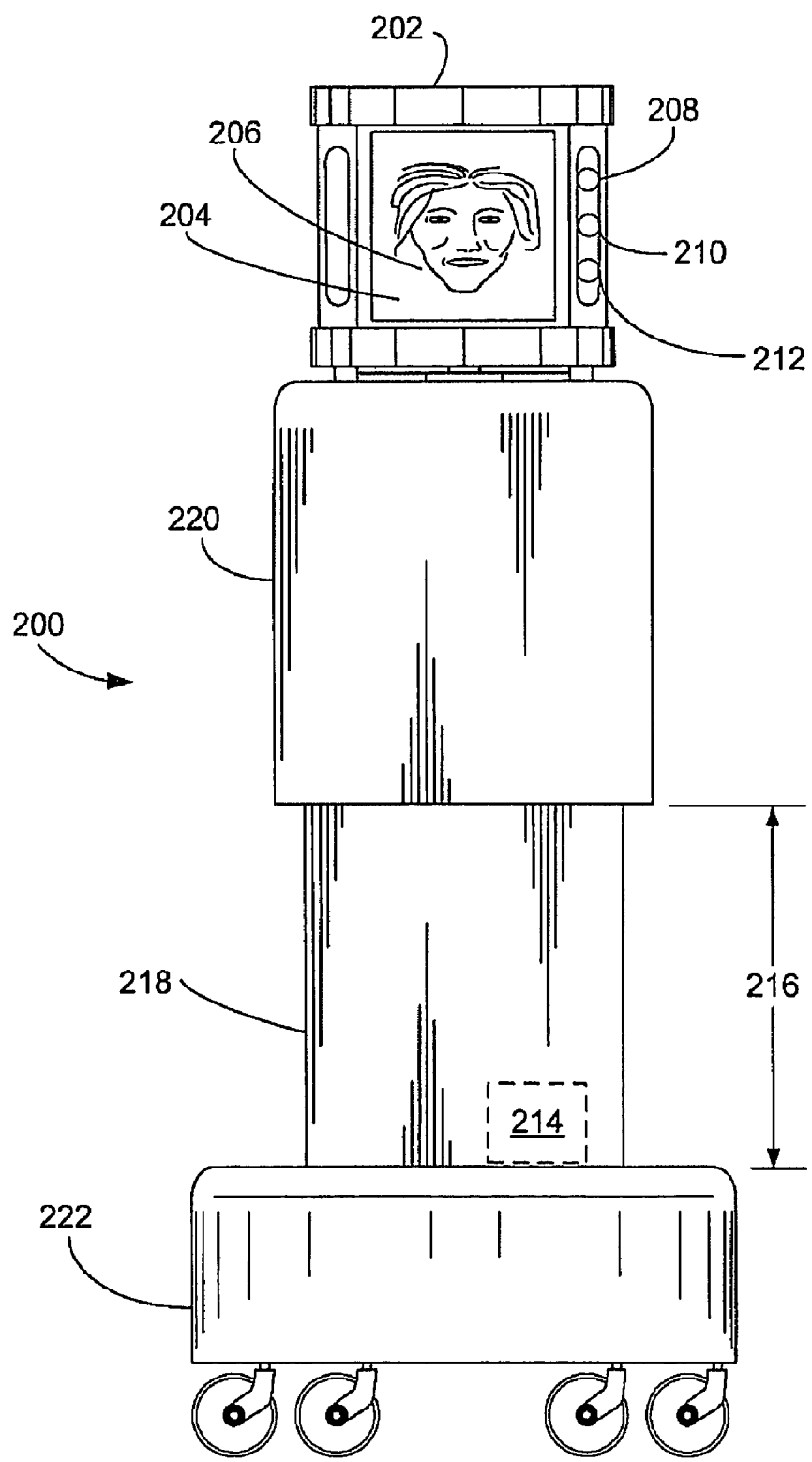
FIG. 3 is a view of a surrogate in accordance with an embodiment of the present invention.

Positioned at each of the four corners of the display apparatus 100 is a camera unit 112. In an alternate embodiment, camera units are located in different positions. For example, the cameras may be positioned at the sides of the apparatus 100, with a camera front of the local user (e.g., by providing apertures in the projection screens 104). In addition, in certain circumstances, a number of cameras greater than or less than four may be provided. The camera units 112 are used to acquire different positional views of the user's head. Each camera unit 112 is connected to a corresponding processing device, such as computer 114, used to process the signals provided by the camera units 112. The computers 114 are interconnected to form a network. Each of the camera units 112 includes a color camera 116 and a monochrome near-infrared camera 118 (FIG. 2). As illustrated in greater detail in FIG. 2, the color camera 116 includes a pin-hole lens 120, provided on an extension 122. The pin-hole lens has an opening 116p. Likewise, the near-infrared camera 118 includes a pin-hole lens, provided on an extension 124. The pin-hole lens of the near-infrared camera 118 has an opening 118p. In an exemplary embodiment, the color camera 116 is a conventional charge-coupled device (CCD) camera equipped first with an R-pass only filter; next with a B-pass only filter; then with a G-pass only filter that are interleaved in two dimensions over the CCD pixel array. The near-infrared camera 118 is a monochrome CCD camera equipped with a visible-cut near-infrared pass filter which only allows passage of light having a wavelength in the near-infrared spectrum.

As shown in FIG. 2, in an exemplary embodiment, the color camera 116 is stacked on top (i.e., in a vertical orientation) of the near-infrared camera 118 in order to reduce parallax error between the two cameras. In an alternate embodiment, the camera positions can be switched. Also, in another alternate embodiment, the color camera 116 and the near-infrared camera 118 can be positioned side-by-side (i.e., in a horizontal orientation). Other arrangements using a common lens and a beam splitter may also be used. The two cameras should be placed in close proximity to one another in order to reduce parallax error between the two cameras.

In operation, the near-infrared illuminators 106 uniformly illuminate the rear projection screen 104 with light having a wavelength in the near-infrared spectrum. The near-infrared camera obtains a still image of the display apparatus with the user absent (i.e. a baseline image). Then, when the user is present in the display apparatus, the baseline image is subtracted from images newly obtained by the near-infrared camera. The resulting difference images show only the user. As mentioned, this is referred to as difference keying.

The display apparatus 100 is positioned at a user's location while a robotic device or a surrogate 200 is positioned at a surrogate's location, which may be remote from the user. The surrogate simulates the user's presence at the location of the surrogate 200 without the user having to be physically present at that location. For example, the surrogate may be physically present in a conference room that is located a great distance away from the user; thus, allowing the user to participate in a meeting taking place at that location without the user having to travel to the location. The surrogate 200 is preferably connected to the display apparatus 100 via a link 126 (FIG. 1) to a high-speed network for receiving image, sound and other information from the display apparatus 100.

The surrogate 200 has a surrogate's head 202 that includes one or more surrogate face displays 204 such as one or more CRT's or liquid crystal display (LCD) panels. The displays 204 show images 206 of the user's head taken by cameras 112 (FIG. 1) while one or more speakers 208 project the user's voice obtained from microphones at the user's location. In addition, one or more cameras 210 capture live video images at the surrogate's location 108 while one or more microphones 212 receive sounds at the surrogate's location 108. These captured images and sounds are reproduced at the display apparatus 100. For example, images from the cameras 210 may be compressed and transmitted over a high-speed network by a surrogate's transceiver-computer system 214 in the surrogate 200 to the user's computer system 114 (shown in FIG. 1) at the user's location. Preferably, a display 204 is positioned at each of four sides of the head 202, while a speaker 208, a camera 210 and a microphone 212 are positioned at each of the four corners of the head 202. Thus, depending upon the angular orientation of the user's head, one or more of the speakers 208 may be selected to direct the user's voice in a direction that corresponds to the angular orientation of the user's head.

The surrogate 106 preferably includes two parts that are movable relative to each other over a distance 216. One part is a leg portion 218 and one part is a torso portion 220. The surrogate's head 202 is mounted above the torso portion 220, and the torso portion 220 may be raised or lowered relative to the leg portion 218 so as to raise or lower the surrogate's head 202 relative to the surface on which the surrogate 200 moves or is moved, thus being able to simulate the actual height of the user. The surrogate 200 includes a drive portion 222, which permits movement of the surrogate 200.

Figure 4:
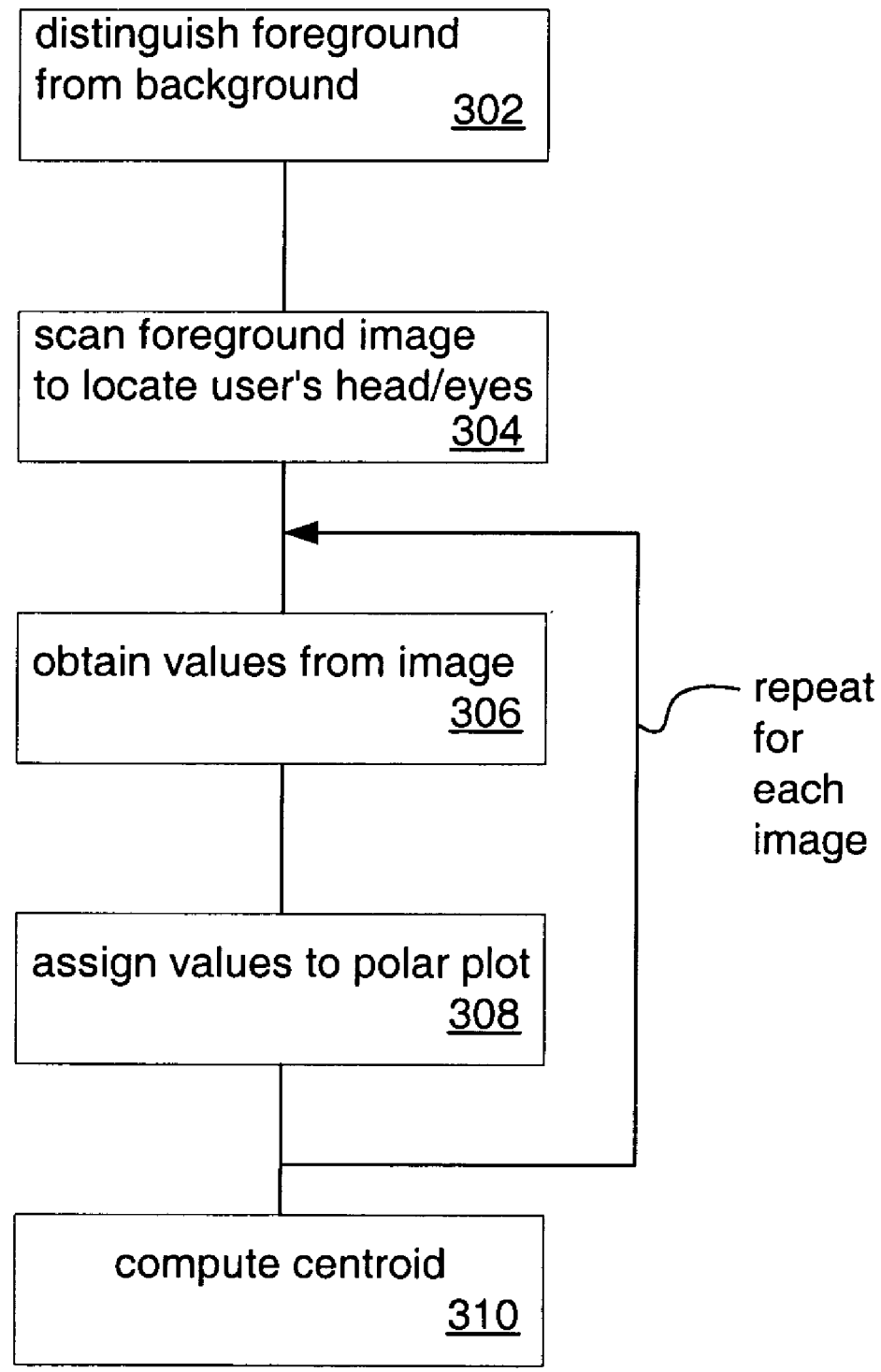
FIG. 4 is flowchart illustrating a method for determining an angular orientation of a user's head in accordance with an embodiment of the present invention.

The processing steps performed to determine the angular orientation of the local user's head will now be discussed in connection with FIG. 4. FIG. 4 shows an exemplary flowchart of a method for determining an angular orientation of a user's head in accordance with an embodiment of the present invention. At the outset, it should be understood that the processing steps discussed below could be performed by any suitable processing device, such as computer(s) 114 (FIG. 1) configured to operate according to a stored software program, the software program being encoded on a computer readable medium. The processing steps can also be performed by a dedicated computing device, such as an application specific integrated circuit (ASIC) or the like. In an exemplary embodiment of the present invention, the processing devices are computers, each equipped with a video capture card that provides for image processing on a frame-by-frame basis. As discussed above, the rear projection screen 104 is uniformly illuminated with near-infrared light by the near-infrared illuminators 106. The video image of the remote location, if any, is then projected on to the rear projection screen 104 by the rear projector 108. The local user is positioned generally within the center of the display apparatus 100.

The foreground (e.g., the user's head 102) is distinguished from the background in step 302. This includes detecting luminance differences within the display apparatus 100. This is done through the use of the near-infrared pass, visible-cut cameras 118. As discussed above, each of the rear projectors 108 emit negligible amounts of light in the near-infrared spectrum. Thus, the color images provided by the rear projectors 108 have negligible impact on the luminance value of the rear projection screen 104 or what the near-infrared cameras 118 detect. As each of the near-infrared cameras 118 is equipped with visible-cut near-infrared pass filters, they are only capable of detecting light in the near-infrared spectrum. Thus, the changing color images on the rear projection screen 104 are not detected by the near-infrared cameras 118. An object within the display apparatus 100, for example the head 102 of the local user, having a different luminance value from the rear projection screen 104 is assumed to be in the foreground of the image. The video signals representing the background and foreground portions of the image are transmitted to the corresponding computer 114 for processing. The foreground and background images may also be displayed on a suitable monitor. Video signals displayed on a video monitor sometimes contain artifacts along the outer boundaries of the image. Such artifacts are ignored by the method of the present invention. This is referred to as overscan.

While difference keying using near-infrared is preferred for distinguishing foreground from background, it will be apparent that another technique may be used. For example, where the background is of uniform color, the foreground can be distinguished based on color differences. As another example, luminance keying may instead be used to detect the user, in which case, the near-infrared light provides the background that is used by the near-infrared camera 118 in detecting the luminance difference between the head of the local user 102 and the rear projection screen 104. Any luminance detected by the near-infrared camera 118 outside of a range of values specified as background is considered to be in the foreground. This is referred to as luminance keying. Also, while the image data used to obtain luminance values is preferably in the near-infrared, luminance values may be obtained at other wavelengths (e.g., in the visible spectrum).

Once the foreground has been distinguished from the background, the user's head may then be located in the image. The foreground image may be scanned in step 304 from top to bottom in order to determine the location of top of the local user's head. The foreground image may be scanned in a series of parallel lines (i.e. scan lines) until a predetermined number, h, of adjacent pixels within a scan line, having a luminance value within foreground tolerance are detected. In an exemplary embodiment, h equals 10. This detected region is assumed to be the top of the local user's head. By requiring a significant number of adjacent pixels to have similar luminance values, the detection of false signals due to video noise or capture glitches are avoided.

Then, a portion of the user's head preferably below the forehead and approximately at eye-level is located. This portion of a user's head is useful because the luminance values obtained from the user's face at this level will tend to exhibit substantial symmetry with respect to a vertical plane that divides the person's face. This measurement may be performed by moving a distance equal to a percentage of the total number of scan lines down from the top of the originally detected (captured) foreground image. The percentage used may a user-definable parameter that controls how far down the image to move when locating this approximately eye-level portion of the user's head. In an exemplary embodiment of the present invention, a value of 10% is used. For example, if 480 scan lines were used to capture the foreground image, the method of the present invention causes the computer 114 to move forty eight scan lines down from the top of the user's head in the image to measure the width of the image, which is assumed to be the head of the local user.

The left edge of the foreground image may be identified by detecting the leftmost foreground pixel value of the scan line. The right edge of the foreground image is acquired by detecting the rightmost foreground pixel value of the scan line. The leftmost pixel value is subtracted from the rightmost pixel value to determine the width of the foreground image, which corresponds to the width of the local user's head at this level.

Luminance values may then be obtained in step 306 for the pixels that correspond the portion of the user's face located in step 304. The number of pixels in the obtained image at approximately eye-level may be given as P where the pixels of the image starting at the left-most edge of the user's head and ending at the right-most edge of the users' head are assigned numbers from one to P. A luminance value corresponds to each pixel.

Then, in step 308, a luminance value is assigned to each position in a polar plot. This step essentially projects luminance values obtained from a two-dimensional image of the user's head onto a three-dimensional object that approximates the user's head. FIG. 5 shows a camera 112 (FIG. 1) viewing a user in the display apparatus 100, as seen from above. The user's head (including their hair) is approximated by a cylindrical section 402. In a preferred embodiment, the diameter of the cylindrical section 402 is ten inches, though it will be apparent that a larger or smaller diameter may be selected. An origin is assigned to the cylindrical section 402 for the polar plot.

As mentioned, the width of the user's head (measured in pixels) is known (where the number of pixels is P). Each of the four cameras 112 faces a corresponding quadrant of the user's head. The quadrants for the polar plot are defined by the camera positions. For each position of interest in each quadrant (e.g., every degree), the position in the video image corresponding to that angle on the cylinder 402 is computed with respect to the origin 404. From this, its position in the polar plot is known.

It is also assumed that the user's head is roughly centered in the display apparatus 100, and thus, there is a distance of approximately three feet between the user's head to each of the cameras 112 in each of the four corners in the display apparatus 100. The radius r of the cylinder 402 in feet is given as: $r=(10/2)/12=0.417$ feet. The distance from the camera to the center of the user's head dcu is thus given by: $dcu=3+(10/2)/12=3.417$ feet. The center of the cylinder 402 is defined as the origin of an x and y axis. Assuming the camera and lens do not introduce perspective distortion (while not true, though this simplifies the calculations), the user's head would span an angle of $2*\arctan(r/dcu)=2*\arctan(0.417/3.417)=13.916$ degrees. The P pixels of the user's head also span approximately the same angle, but as can be seen from FIG. 5, the mapping from rotational angle around the user's head to pixel position is a non-linear mapping.

As an example for one position in the polar plot, assume we are interested in a point p10 on the user's head that is 10 degrees clockwise looking down from above (i.e., to the left of the centerline as seen by the camera). From trigonometry and given the origin at the center of the user's head, this point would intersect the surface of the cylinder at coordinates of $y=r*\sin(theta)=0.417*\sin(10)=0.0724$ feet and $x=-r*\cos(theta)=-0.417*\cos(10)=-0.411$ feet. This point is at an angle of $\arctan(0.0724/3.417-0.411)=1.380$ degrees left of the centerline of the camera. This angle, if extended to $x=0$, would have a y coordinate of $3.417*\tan(1.380)=0.0823$ feet. Given that the span of the user's head is $2*r=0.834$ feet, which corresponds to P pixels, then point p10 on the user's head should be $(0.0823/0.834)*P=0.0987*P$ pixels to the left of the center of the user's head in the obtained image.

Because the positions of interest in the polar plot are preferably spaced at uniform intervals (e.g., one degree), the positions do not generally coincide with the locations pixels from the foreground image. If a pixel distance such as $0.0987*P$ has a fractional component (as will generally be the case), linear interpolation may be used to create a luminance value for the polar map. For example, if an angle maps to a desired value of 5.70 pixels from the center, then the desired luminance value is 0.70 times the value of pixel 6 from the center and 0.30 times the value of pixel 5 from the center. This also assumes there are an odd number of pixels in the cross section of the image of the user's head. Instead, if there is an even number of pixels, then there are an equal number of pixels on each side of the center, which is halfway between the P/2 and (P/2)+1th pixels, and the P/2th pixel is a distance of 0.5 pixels from the center.

This process is repeated for each position of interest within each quadrant using each of the four images, one for each quadrant. Thus, the steps of scanning the image (step 304), obtaining the luminance values (step 306) and assigning luminance values to the polar plot (step 308) are repeated for each quadrant.

The outermost pixel in each camera's quadrant may be calculated as follows. This pixel is at an angle just less than 45 degrees clockwise beyond the centerline of the camera. This point is located at $x=-0.417*\cos(45)=-0.295$ feet and $y=0.417*\sin(45)=0.295$ feet. This yields an effective angle of $\arctan(0.295/3.417-0.295)=5.398$ degrees. This angle intersects the y-axis at $y=3.417*\tan(5.398)=0.323$ feet. Thus, the leftmost of the P pixels that contributes to the polar plot from this camera is $(0.323/0.834)*P=0.387*P$ pixels from the center of the user's head in the image obtained from head tracking. A total of twice this value, or $0.387*2*P=0.775*P$ pixels, contribute to the polar plot from this camera in total.

Then, once luminance values have been assigned to all of the positions of interest in the polar plot, a centroid is computed in step 310 from the assigned values. The centroid computation essentially determines a weighted average similar to a center of mass for the polar plot where the luminance values correspond to weights positioned about the circumference of the cylindrical section. The polar coordinates of each point in the polar plot may be converted to Cartesian (rectangular) coordinates, and all the x and y coordinates may be averaged together to compute the (x, y) coordinates of the centroid. Converting these coordinates back to polar coordinates yields the angular orientation of the user's head with respect to the origin of the polar plot.

It should be noted that for most people, their faces and skin will appear brighter in the near infrared image than their hair. This is because red objects generally reflect near infrared well, and the hemoglobin in blood is red in color. Thus, it can be assumed that the position of the centroid indicates the location of the front center of the person's head. In some cases, however, a person's hair may appear brighter than their face, such as where the person has light-colored hair and dark skin or where the person is bald. In these cases, the centroid indicates the back center of the person's head. Thus, in one aspect of the invention a control input may be provided that rotates the computed orientation angle by 180 degrees.

As mentioned, more or fewer cameras may be used. For example, where three equally-spaced cameras are used, luminance values from each of three images are mapped to 120 degrees of the polar plot (for a total of 360 degrees) using essentially the same method as described above. Similarly, where five equally-spaced cameras are used, luminance values from each of five images are mapped to 72 degrees of the polar plot. Thus, the polar plot may be divided into sectors with an image being obtained for each sector and with all sectors of the polar plot being imaged.

Preferably, the cameras are all set to the same manual exposure settings. This helps to ensure that camera auto exposure functions do not set the different cameras to different exposure settings. If the cameras have different exposure settings, two cameras viewing a pixel at a quadrant interface would tend not to see the same pixel luminance value. This would lead to a discontinuity at a quadrant boundary and would make the data in one quadrant not comparable to data from another quadrant. As a result, inaccuracies may be introduced into the determination of the location of the centroid. To reduce inaccuracy, the cameras are also preferably equipped with equivalent lenses.

Even with the same exposure settings and lighting, there is expected to be some small variation from camera to camera for a given point on a user's head. Calibrating the cameras relative to each other is preferably performed to compensate for this variation. To accomplish this, a cylindrical reference object that is preferably gray in color is placed in the center of the display apparatus 100 (FIG. 1) in place of the user's head 102. The average luminance value for each camera over the span of the reference object is computed. Then the ratio of the average of all four cameras divided by the per-camera average is computed for each camera. This is used as a correction factor for all luminance data obtained from the camera. For example, if one camera reads an average of 90 for the test object, but the average of all the cameras is 100, then each pixel in images from the camera is multiplied by 10/9. Note that if the camera pixel values are multiplied by a value greater than unity, either a saturating multiply must be used so that the pixel values do not overflow, or the arithmetic must be performed over a larger range than that provided by the original pixel values.

Under non-uniform lighting conditions, the luminance of the test object may also vary significantly with the distance from the test object to the camera. If this is the case, then instead of using a single correction value for each camera, different values may be computed for each distance or position in the cube, and the proper correction coefficient chosen based on the position of the user's head reported from a head position tracking subsystem. A head position tracking technique is described in U.S. patent application Ser. No. 09/784,902, filed Feb. 15, 2001, which is incorporated by reference herein in its entirety.

The computations above assume that the camera and lens do not introduce perspective distortion so that the rays from the camera could be assumed to intersect the cylindrical approximation to the user's head at the y-axis. FIG. 6A shows rays 502 from the camera intersecting the approximation of the user's head at the y-axis. However, the rays 502 are tangent to the cylinder before the y-axis is reached, as shown in FIG. 6B.

The error introduced by this assumption is expected to be insignificant when the distance from the camera to the cylinder is greater than a few diameters of the cylinder. In the example, the camera is 3/(10/12)=3.6 diameters from the user's head. Even if the user moves their head by a foot in either direction from the center of the display apparatus 100 they will still be more than two diameters away from the camera. Thus, this assumption is not expected to significantly affect the determination of the angular orientation of the user's head.

As mentioned, it is assumed that the user is positioned at the center of the display apparatus 100 (FIG. 1). However, the user is preferably allowed to move to other positions in the display apparatus 100. When the user is not at the center of the display apparatus 100, the portion of the user's head seen by each camera 112 is different than if the user is at the center. If the person moves directly towards or away from a camera, the portion of the person's head seen by the camera will remain the same (the image of their head may get larger or smaller, but the part of their head seen by the camera will remain unchanged). However, if the person shifts to the left or right of the center of a camera's field of view, the part of their head seen by the camera will change. This is illustrated FIG. 7.

Figure 7:
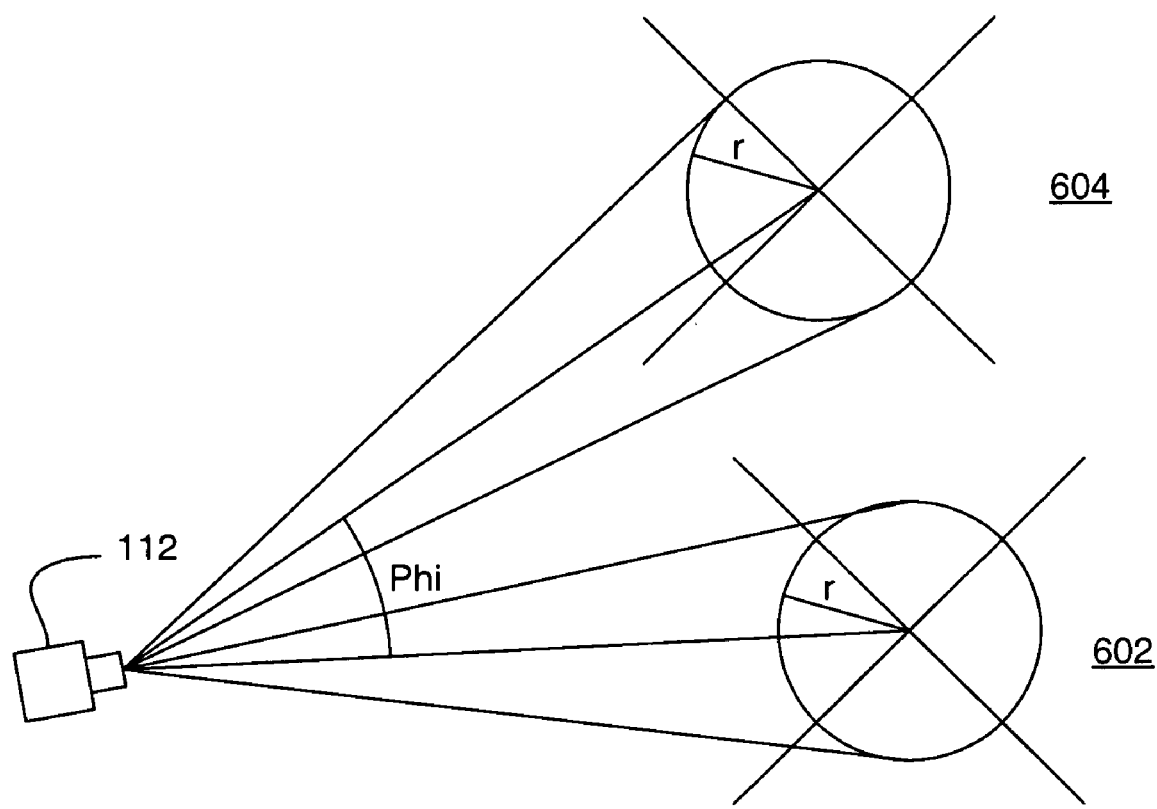
FIG. 7 shows that a part of the user's head seen by a camera changes if the person shifts to the left or right of the center of a camera's field of view in accordance with an embodiment of the present invention.

FIG. 7 shows that the user moves their head to the left of the center of the field of view seen by the camera 112 (i.e. from position 602 to a position 604). The angular difference between the 602 and position 604 from the camera's point of view is $\phi$ degrees. This results in an apparent rotation of the user's head by $\phi$ degrees since the portion of the person's head seen by the camera rotates by $\phi$ degrees. To compensate for this, the step 308 (FIG. 4) of assigning luminance values preferably offsets this apparent translation of angular position to pixel coordinates by $\phi$ degrees. This may be accomplished for each position in the polar plot offsetting the pixel locations from which the luminance value is determined by $\phi$ degrees. For example, to determine the luminance value for a pixel $\theta$ degrees clockwise from the center of a quadrant when the person's head is shifted left in the image by $\phi$ degrees, the value for the pixel at $\theta+\phi$ is returned instead. Similarly, if the user's head is offset to the right of the center of the image by $\phi$ degrees, to find a pixel that is $\theta$ degrees clockwise from the center of the quadrant, the pixel at $(\theta-\phi)$ clockwise from the center of the quadrant is returned instead.

The offset angle $\phi$ may be calculated based on the position of the center of the person's head in the image from the camera 112 and based on the field of view of the camera. For example, assume the center of the person's head is halfway between the center of the image and the left edge of the image, and the field of view of the camera is 75 degrees. Assuming the camera has a perfect lens with no distortion, the angle of the person's head from the center of the image can be computed as follows: let w be the width from the center to the edge, corresponding to 37.5 degrees (half the field of view) and let d be the distance d between the camera and the user's head. Here, the user's head is at half this width from the center, or w/2. We have $\tan(37.5)=w/d$, and $\tan(\phi)=(w/2)/d$. Solving for $\phi$ we get $\phi=\arctan(\tan(37.5)/2)=20.99$ degrees.

For large apparent rotations of the user's head, the desired portions of the person's head may no longer be visible to a specific camera. Further, the required pixels may experience foreshortening in the image, with values being compressed into a small number of pixels. Objects that protrude from the user's head (e.g., ears and nose) can further complicate recovering data. Thus, as the offset angle becomes greater, the recovery of the data becomes more difficult, though the degree to which this occurs depends on the distance from the camera to the person's head.

As mentioned, the user's head may be modeled by a cylindrical section 402 (FIG. 5). However, depending on the user's hair style, their head and hair may deviate significantly from this cylindrical section model. For example, if a person has her hair in a bun, their head (including hair) will tend to be significantly wider from front to back than from side to side. The user's head position and size may be independently determined for each camera's view. Based on typical aspect ratios of human heads, the expected eye level (i.e., the distance from the top of the person's head to their eye level) may be determined as a proportional function of the image head size. For example if a person is closer to a camera, their eyes will be a larger number of pixels down from the top of their head in the view seen by the near camera than in a view seen by a far camera. If a person's head (including their hair) is highly elliptical instead of circular at eye level, a camera seeing the wide part of the ellipse will result in a lower expected eye level. If each quadrant of the polar plot is at a significantly different level of the user's head, data in the different quadrants will not be comparable, and discontinuities at the border between quadrants may result.

One way to surmount this difficulty is to compute the position of the person's head in the display apparatus, and use this to compute the expected scale in each camera's view. Techniques for computing the position of the user's head (i.e. head tracking) are discussed in the above-cited, co-pending U.S. patent application Ser. No. 09/784,902, filed Feb. 15, 2001, incorporated by reference herein. Assuming the person's eyes are always a fixed distance down from the top of their heads, and combined with an expected image scale based on information from head tracking, the eye level of the user can be more accurately set. If a fixed distance appropriate for most adults is used, this may generate an eye level that is too low for children. Thus, different values may be used depending on whether the user is an adult or child. Also, the expected eye level tends to vary with the height of the user's hair above the top of their head. For example, the expected position of a bald person's eyes would be low by about a half inch while the computed eye position of someone with a bouffant hairdo would be too high. It has been observed that errors in estimating the user's eye level are less significant where the eye level is estimated too low. This is because features of a person's face below the eye level tend to provide variations in luminance that will allow the techniques of the invention to identify a distinct centroid, whereas, features at the user's forehead or above tend to be less useful. Thus, errors in approximating the user's eye level may be accommodated by using a fixed distance that tends to estimate height of the eyes to the low side. More importantly, all of the quadrants of the polar plot contain data from roughly the same level, so the results from different cameras are comparable and discontinuities are minimized.

If the user tilts their head to the front or back (i.e., changes pitch), due to the symmetry of the human head, it is expected the polar plot will still contain symmetric data from around the user's head. However, large tilts can create more exceptions to the assumptions underlying the algorithm. However, because remote imagery is projected around the user on the projection screens 104 (FIG. 1) the user is expected to be usually looking around and not tilting their head by a large amount. One exception to this might be if the user had a laptop on their lap. In this case they could spend a significant portion of their time with their head tilted down. Here, it would be useful for the polar plot to be initially low enough around their head so that once they tilted their head, the hair above their forehead (assuming they have hair there and are not bald) did not become the source data for the polar plot. This is because if the polar plot did contain data from the hair in front of their head, there could be little or no difference between the front and the back of their head as seen by the polar plot.

As mentioned, the invention makes use of the fact that people's heads are generally symmetrical, and that the front of their head has higher luminance variance than the back of their head. To reduce the amount of data to be processed, data may be obtained from a one-pixel wide band around the user's head that is at the expected eye level of the user. It will be apparent that additional data may be utilized. For example, data may be obtained from a wider band around the user's head. Where the band is multiple pixels wide, the luminance values may be averaged in the vertical direction or bi-linear interpolation may be used to assign luminance values to positions on the polar plot. In one embodiment, if more accurate results are desired, the average of more than one polar plot obtained at different heights around the person's head may be computed. For example, one polar plot may be obtained at the expected eye-level of the user and another polar plot may be obtained at the expected mouth level of the user and the results may be averaged.

In another embodiment, vertical variance of luminance values may be determined. This may be accomplished by computing variance of the luminance values obtained in a vertical span of the user's head for each angle position of interest in the polar plot. For example, the span may be approximately ⅓ of the width of the person's head centered at approximately eye- and ear-level. In areas such as the back of a person's head, the vertical variance at ear-level is quite low, as this area is usually covered by either a uniform area of hair or bare skin (in the case where the person is entirely bald). In contrast, there is usually significant vertical variance around a person's eyes, due to the shadows from their eye sockets and the whites of their eyes. A moderate amount of variance can occur around a person's ears, but this variance is generally balanced on either side of a person's head and, thus, will not affect the position of the centroid.

The luminance variance procedure has two significant advantages over the simpler luminance only procedure. First, because the luminance variance is based on vertical variance, only a single camera enters into the calculation of variance at each angle. This computation is insensitive to the actual camera exposure values so the effects of differences in calibration between the cameras on the different sides of the user are reduced. Second, the luminance variance is based on a band of data around the user's head instead of a single-pixel wide ring around the user's head. This means that more information is taken into account making the results more robust.

Yet another embodiment makes use of frequency content in the vertical direction at each position of interest in the obtained luminance values. Areas in the front of the face such as the eyes, nose, and mouth have luminance values that vary from a skin value to another and back. By looking at the centroid of frequencies such as one through seven per vertical band, we would expect areas with these facial features to be more highly weighted when the contributions of the selected frequencies are summed together, therefore orienting the centroid in the direction of the person's head. In contrast, areas such as the hairline of a bald person only transition once from the skin luminance to the hair luminance, so they would not have as much content at higher frequencies and, thus, the summed contributions of selected frequencies would be less. Known techniques for determining spectral content of discrete signals may be used. Because there are only a small number of data points in each band, techniques such as Discrete Cosine Transform (DCT) are preferred over techniques such as FFT.

The above detailed description of the present invention has been presented for the purpose of illustration and description. Although the present invention has been described with respect to specific embodiments, various changes and modifications may be suggested. It is intended that the present invention encompass such changes and modifications as fall within the scope of the claims appended hereto.

What is claimed is:

1. A method for determining the angular orientation of an object comprising:
    obtaining a plurality of images of the object wherein the plurality of images consists of three images taken by each of three cameras;
    assigning values to a plurality of positions in a polar plot using data from the images, the polar plot having an origin and data from each image being assigned to a corresponding sector of the polar plot and wherein said assigning includes assigning one of the images to each of three 120 degree intervals of the polar plot; and
    computing a centroid based on the assigned values wherein an angle of the centroid with respect to the origin indicates the angular orientation of the object.

2. The method according to claim 1, further comprising calibrating the cameras prior to obtaining the images from the cameras.

3. The method according to claim 2, wherein said calibrating comprises obtaining images of a cylindrical object of uniform color.

4. A method for determining the angular orientation of an object comprising:
    obtaining a plurality of images of the object;
    assigning values to a plurality of positions in a polar plot using data from the images, the polar plot having an origin and data from each image being assigned to a corresponding sector of the polar plot;
    computing a centroid based on the assigned values wherein an angle of the centroid with respect to the origin indicates the angular orientation of the object; and determining a location of the object in the field of view of each of a plurality of cameras and when the object is not in the center of the field of view, said assigning is corrected according to its distance from the center.

5. The method according to claim 4, wherein said assigning comprises identifying positions in the polar plot that are uniformly spaced, identifying corresponding pixels in the image for the positions in the polar plot and assigning luminance values for the pixels to the positions in the polar plot.

6. The method according to claim 5, wherein said assigning further comprises interpolating for positions in the polar plot that are between pixels.

7. The method according to claim 4, wherein said assigning results in a non-linear mapping of pixel position to polar position.

8. The method according to claim 4 further comprising determining a width of the object by scanning each image.

9. The method according to claim 4, wherein the plurality of images consists of four images taken by each of four cameras and wherein said assigning includes assigning one of the images to each of four quadrants of the polar plot.

10. The method according to claim 4, the polar plot is divided into sectors with an image of the plurality being obtained for each sector and with all sectors of the polar plot being imaged.

11. The method according to claim 4, wherein said images are obtained from near-infrared light from the object.

12. The method according to claim 4, wherein the values assigned to the polar plot are luminance values obtained from a band around the object that is one pixel wide.

13. The method according to claim 4, wherein the values assigned to the polar plot are luminance values obtained from a band around the object that is multiple pixels wide.

14. The method according to claim 13, wherein the luminance values assigned to the polar plot represent a vertical average.

15. The method according to claim 13, wherein said assigning further comprises performing bi-linear interpolation for positions in the polar plot that are between pixels.

16. The method according to claim 4, wherein the values assigned to the polar plot represent vertical frequency content.

17. A method for determining the angular orientation of an object comprising:
    obtaining a plurality of images of a person's head;
    assigning values to a plurality of positions in a polar plot using data from the images, the polar plot having an origin and data from each image being assigned to a corresponding sector of the polar plot;
    computing a centroid based on the assigned values wherein an angle of the centroid with respect to the origin indicates the angular orientation of the person's head; and
    performing a 180 degree correction of angular orientation of the person's head.

18. The method according to claim 17, further comprising directing the person's voice at a remote location according to the angular orientation of the person's head.

19. The method according to claim 17, further comprising estimating a vertical position of the person's eyes and obtaining luminance values of the images at or below the level of the person's eyes.

20. The method according to claim 19, wherein said estimating comprises scanning the images to locate the top of the person's head and measuring a distance down from the top of the person's head.

21. The method according to claim 19, wherein said estimating comprises scaling the images.

22. The method according to claim 17, further comprising displaying images of a remote location for the person.

23. The method according to claim 17, wherein said images are formed by performing difference keying.

24. The method according to claim 23, wherein said images are obtained from near-infrared light from the person's head.

25. The method according to claim 23, wherein said performing difference keying includes subtracting a baseline image of an apparatus from an image obtained with the person's head being located within the apparatus.

26. The method according to claim 25, wherein the apparatus comprises projection screens that substantially surround the person.

27. A method for determining the angular orientation of an object comprising:
   obtaining a plurality of images of the object;
   assigning values to a plurality of positions in a polar plot using data from the images, the polar plot having an origin and data from each image being assigned to a corresponding sector of the polar plot and wherein the values assigned to the polar plot represent vertical luminance variance; and
   computing a centroid based on the assigned values wherein an angle of the centroid with respect to the origin indicates the angular orientation of the object.

28. A computer-readable medium encoded with a program of instructions executable by a machine to perform method steps for determining the angular orientation of an object, said method steps including obtaining a plurality of images of the object, assigning values to a plurality of positions in a polar plot using data from the images, the polar plot having an origin and data from each image being assigned to a corresponding sector of the polar plot, computing a centroid based on the assigned values wherein an angle of the centroid with respect to the origin indicates the angular orientation of the object, and determining a location of the object in the field of view of each of the plurality of cameras and when the object is not in the center of the field of view, said assigning is corrected according to its distance from the center.

29. A system for determining the angular orientation of an object comprising:
   a plurality of cameras that obtain a plurality of images of the object;
   a computer that assigns values to a plurality of positions in a polar plot using data from the images, the polar plot having an origin and data from each image being assigned to a corresponding sector of the polar plot, and the computer computes a centroid based on the assigned values wherein an angle of the centroid with respect to the origin indicates the angular orientation of the object; and
   the computer determining a location of the object in the field of view of each of the plurality of cameras and when the object is not in the center of the field of view, said assigning is corrected according to its distance from the center.

30. A method for determining the angular orientation of an object comprising:
   obtaining a plurality of images of the object;
   assigning values to a plurality of positions in a polar plot using data from the images, the polar plot having an origin and being in a plane that is independent of planes of the images;
   computing a centroid based on the assigned values wherein an angle of the centroid with respect to the origin indicates the angular orientation of the object; and
   determining a location of the object in the field of view of each of a plurality of cameras and when the object is not in the center of the field of view, said assigning is corrected according to its distance from the center.

31. The method according to claim 30, wherein said assigning comprises identifying positions in the polar plot that are uniformly spaced, identifying corresponding pixels in the image for the positions in the polar plot and assigning luminance values for the pixels to the positions in the polar plot.

32. The method according to claim 30, wherein said assigning results in a non-linear mapping of pixel position to polar position.

33. The method according to claim 30, the polar plot is divided into sectors with an image of the plurality being obtained for each sector and with all sectors of the polar plot being imaged.

34. The method according to claim 30, wherein the object is a person's head.

35. The method according to claim 34, further comprising directing the person's voice at a remote location according to the angular orientation of the person's head.

36. The method according to claim 30, wherein the values assigned to the polar plot are luminance values obtained from a band around the object that is one pixel wide.

37. The method according to claim 30, wherein the values assigned to the polar plot are luminance values obtained from a band around the object that is multiple pixels wide.

38. A method for determining the angular orientation of an object comprising:
   obtaining a plurality of images of the object;
   assigning values to a plurality of positions in a polar plot using data from the images wherein the values assigned to the polar plot represent vertical luminance variance, the polar plot having an origin and being in a plane that is independent of planes of the images; and
   computing a centroid based on the assigned values wherein an angle of the centroid with respect to the origin indicates the angular orientation of the object.

* * * * *